US006282568B1

(12) United States Patent
Sondur et al.

(10) Patent No.: US 6,282,568 B1
(45) Date of Patent: Aug. 28, 2001

(54) PLATFORM INDEPENDENT DISTRIBUTED MANAGEMENT SYSTEM FOR MANIPULATING MANAGED OBJECTS IN A NETWORK

(75) Inventors: Raghavendra Sondur, Santa Clara; Ping Luo, Union City, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/205,868

(22) Filed: Dec. 4, 1998

(51) Int. Cl.[7] .......................... G06F 15/173; G06F 15/16
(52) U.S. Cl. .................. 709/223; 709/203; 370/254; 395/500; 395/712
(58) Field of Search ........................ 709/203, 223; 714/38; 370/254; 395/500, 712

(56) References Cited

U.S. PATENT DOCUMENTS

| 5,388,189 | | 2/1995 | Kung . | |
|---|---|---|---|---|
| 5,473,596 | | 12/1995 | Garafola et al. . | |
| 5,726,979 | * | 3/1998 | Henderson et al. | 370/254 |
| 5,787,245 | * | 7/1998 | You et al. | 714/38 |
| 5,828,840 | * | 10/1998 | Cowan et al. | 709/203 |
| 5,923,885 | * | 7/1999 | Johnson et al. | 395/712 |
| 5,926,631 | * | 7/1999 | McGarvey | 395/500 |
| 6,058,420 | | 5/2000 | Davies . | |
| 6,098,093 | * | 8/2000 | Bayeh et al. | 709/203 |

FOREIGN PATENT DOCUMENTS

| 398987 | 5/1997 | (EP) . |
|---|---|---|
| 2254522 | 10/1992 | (GB) . |

OTHER PUBLICATIONS

3com, HP Openview for Windows User Guide for Transcend Management Software, Oct. 1997, Hewlett–Packard Co. pp. 4.17–4.33.

Cisco, Chapter 5: Using Threshold Manager, Cisco Systems Inc., Jan. 1997, pp. 5.1–5.18.

3com, Transcend Enterprise Manager Alarm Management User Guide Version 4.2 for UNIX, 3com Corp., Mar. 1997, pp. 1.1–4.

Sun Microsystems, Soltice Enterprise Manager 2.1: A Technical White Paper, Sun Microsystems, Inc., Jan. 1997, pp. 1–63.

* cited by examiner

*Primary Examiner*—Ario Etienne
*Assistant Examiner*—Frantz B. Jean
(74) *Attorney, Agent, or Firm*—Kudirka & Jobse LLP

(57) ABSTRACT

The client portion of a distributed client-server network management system uses an interface designed with, and written in, a platform independent language, such as Java. This allows management application programs to be written in the platform independent language and insures their portability. The inventive interface caches most of the management information at the server so that only a small client program is necessary. This program can run on a system with minimal resources, thereby allowing a network manager to manage a network from virtually any location on the network. For example, the client management application could be written as a Java applet which could then be run on any Java-enabled browser. The inventive distributed management system can also connect with, and use, the services and structure of existing distributed network management systems.

21 Claims, 9 Drawing Sheets

PLATFORM INDEPENDENT DISTRIBUTED MANAGEMENT SYSTEM FOR MANIPULATING MANAGED OBJECTS IN A NETWORK

FIELD OF THE INVENTION

This invention relates to network management tools for managing distributed networks and, in particular, to tools which are platform independent.

BACKGROUND OF THE INVENTION

Present day telecommunications and information networks have become larger and far more complex than those which have been available only a few years ago. The trend towards increases in size and complexity can be expected to continue at a high rate into the foreseeable future with the proliferation of cellular networks, the development and deployment of global satellite networks, and the expansion of basic wireline networks in developing nations. Both homogeneous and heterogeneous networks are now being connected together b y means of the Internet and other internetwork connection mechanisms.

In order to maintain network reliability and an acceptable quality of service, it is necessary to carefully monitor and manage network resources. However, as existing networks grow larger and more complex, network management also becomes more difficult and more complex. The prior art responded by providing automated management tools for reporting network status. These tools allowed network management personnel to improve the quality of service and maintain high network availability and reliability.

Such automated management tools were distributed and generally arranged as client server applications which provided integrated for supporting heterogeneous network environments. The client portion of the tools was arranged to have a standard interface which minimized variations of look and feel of the system as seen by the network operations personnel whereas the server portion was designed to operate on different platforms. The distributed architecture allowed the tool to evolve and scale as the networks evolved in size, capabilities, and geographies.

One such distributed network management tool is the Solstice Enterprise Manager™ (Solstice EM) network management system which was developed and is marketed by Sun Microsystems, Inc. This tool has an object-oriented and distributed architecture which consists of a plurality of cooperating components, including applications, libraries, information services, databases, and protocols, each of which performs specific tasks. The managed resources are arranged as a plurality of interconnected nodes and "management agents" running in each node gather information about the resources associated with the node. The information is then forwarded back to a management information server (MIS) which interacts with management applications running in other nodes. The MIS can request and change management parameter values, perform requested actions, and receive and evaluate problem reports (e.g. events, such as SNMP traps and CMIP notifications) that the management agents generate.

Although the MIS and the management agents can communicate with each other via various network management protocols such as SNMP, CMIP, or other proprietary/legacy protocols, the Solstice EM™ framework interposes software model representations of managed resources in the MIS between management applications and agents of managed resources. The result is that the management applications need not be concerned with management protocol dependencies of the managed resources since the applications only interact with the software model representations in the MIS.

In particular, the management applications direct management tasks in the MIS via a "Portable Management Interface (PMI)" which is a high-level abstraction of an interface for manipulating objects, regardless of their class description, supported protocol, or location. The PMI is also used by the MIS to communicate with the management agents. For example, the MIS can use a management protocol adapter (MPA) to communicate with a management agent. An MPA translates MIS requests to protocol-specific primitives (e.g. CMIP, SNMP, RPC, or other proprietary/legacy protocol primitives) depending upon the management agent in question. For example, a CMIP MPA communicates with CMIP agents.

While distributed client server network management systems operate well, they have some drawbacks. For example, the client portion of such systems was generally platform dependent. Therefore different client versions were necessary to allow the management operations to be performed from different locations. Further, much of the information, such as events, were forwarded back to the client application and cached in the client application for later review. Therefore, the computer system running the client application had to have significant memory and computing power. Consequently, it was often not possible for network personnel to monitor or manage a network from a convenient location, such as their home.

SUMMARY OF THE INVENTION

The aforementioned drawbacks are addressed in one illustrative embodiment of the invention in which the client portion of a distributed client-server network management system uses an interface designed with, and written in, a platform independent language, such as Java. This allows management application programs to be written in the platform independent language and insures their portability.

Further, in accordance with another aspect of the invention, the inventive interface caches most of the management information at the server so that only a small client program is necessary. This program can run on a system with minimal resources, thereby allowing a network manager to manage a network from virtually any location on the network. For example, the client management application could be written as a Java applet which could then be run on any Java-enabled browser.

In accordance with still another aspect of the invention, the inventive distributed management system can connect with and use the services and structure of existing distributed network management systems. For example, the inventive system can operate with the Solstice EM™ system described above.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENT

Figure 1:
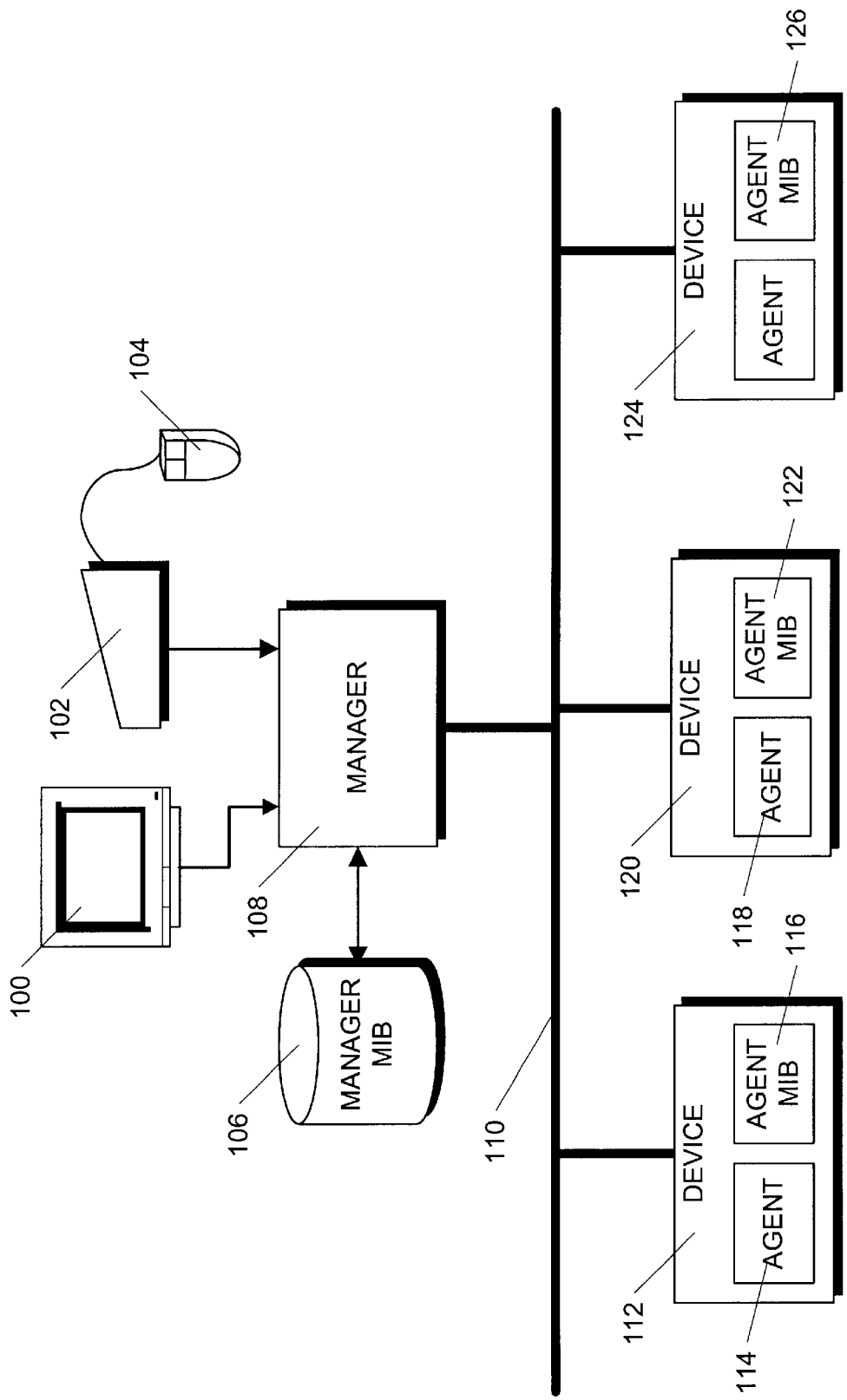
FIG. 1 is a block schematic diagram of a distributed network management system on which the present invention can be operated.

FIG. 1 is a block diagram of a distributed network management system on which an illustrative inventive network management system constructed according to the present invention can run. As shown, the system is a distributed computing environment comprising a plurality of individual computer nodes 108, 112, 120 and 124. The nodes are functionally organized into device nodes 112, 120 and 124 and at least one manager node 108 interconnected over a network 110. However, the device nodes 112, 120 and 124 and manager 108 can also be implemented on a single computer system. The manager node 108, is a conventionally programmed digital computer which includes user interfacing devices, such as a monitor 100, keyboard 102 and mouse 104. In the described embodiment, each node 108 is a network connectable computer, such as a Sun SparcStation™5 workstation running the Solaris™ operating system, a version of the UNIX® operating system, or an IBM-compatible computer running the Windows NT™ operating system. However, use of the systems and processes described and suggested herein are not limited to a particular computer configuration. SparcStation™ and Solaris™ are trademarks of Sun Microsystems, Inc., Mountain View, Calif. UNIX® is a registered trademark of The Open Group, Cambridge, Mass. Windows NT™ is a trademark of Microsoft Corporation, Redmond, Wash. The manager node 108 also includes a database 106, such as a relational database, file system or other organized data storage system which stores management information in a management information database or MIB.

The Java programming language is rapidly emerging as the preferred object-oriented programming (OOP) language for cross platform use because Java programs consist of bytecodes, which are architecture and operating system independent and can be sent over the Internet and other networks. The bytecode is actually executed on a particular platform by means of a "virtual machine"(VM) which allows a Java program to be run on any platform, regardless of whether the Java program was developed on, or for, the particular platform which attempts to run the Java program. Java bytecodes which arrive at the executing machine are interpreted and executed by the embedded VM. A complete Java program is known as an application, while a segment of Java code, which does not amount to a full application, but is reusable, is referred to as an "applet".

Since Java is well-suited to operation on various platforms, the following description of the illustrative embodiment is directed toward the Java programming language. However, it will be obvious to those skilled in the art that the invention could be implemented for other OOP languages as well, e.g. C++.

Each device node, 112, 120 and 124, corresponds to a managed device which might for example, be a processor, printer, storage device, network adapter card or other network apparatus. The state of each managed device is monitored and controlled by an agent program running in the node. For example, agent programs 114, 118 and 128 run in nodes 112, 120 and 124, respectively. Each agent may also have a local management information database (116, 122 and 126, respectively) which stores status information and parameters for the managed device.

In operation, a management application program running in the manager node 108 cooperates with the agents 114, 118 and 128 to manage the network. The manager 108 can download information from the agents 114, 118 and 128 or from their associated databases 116, 122 and 126. The manager node 108 can also set parameters in the devices by instructing the agent programs to set parameters and values within the devices or their drivers.

Figure 2:
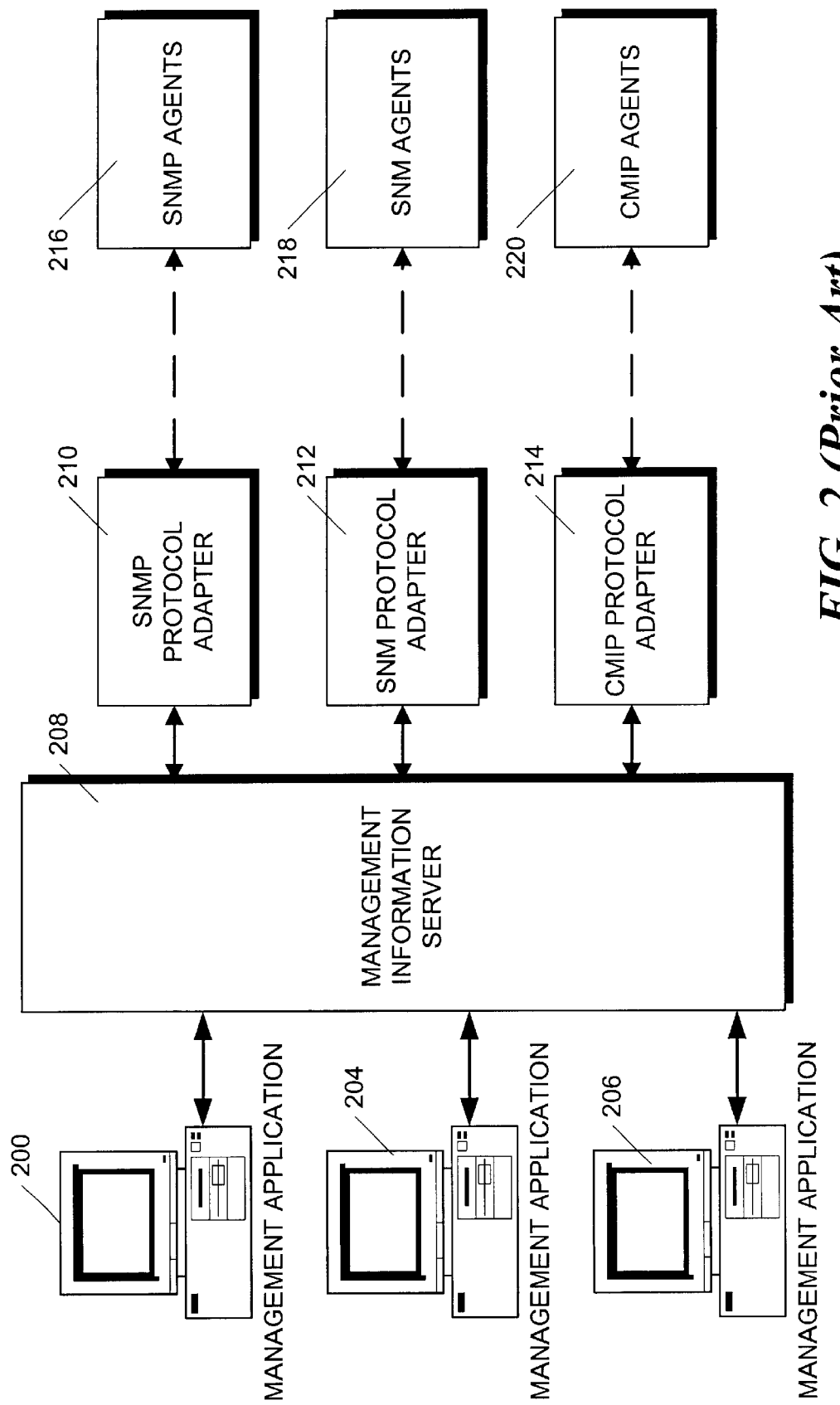
FIG. 2 is a block schematic diagram of a Solstice EM™ distributed network management system on which the present invention can be operated.

In the distributed network management system illustrated in FIG. 1, a single management node 108 is illustrated. This type of system is satisfactory for small networks. However, it does not scale easily because it is difficult to add additional management nodes as the network grows larger. FIG. 2 illustrates a distributed network management system which is designed to be scaleable by using a centralized management information server (MIS) 208. Management information server 208 can provide management information to a number of management applications operating in separate computers 200, 204 and 206, respectively. Alternatively, the management application may operate in one or more computer systems. A system based on this architecture is the Solstice Enterprise Manager™ network management system which is available from Sun Microsystems, Inc., 901 San Antonio Road, Palo Alto, Calif. The remainder of the application will be described in the context of the Solstice EM™ system. However, it will be obvious to those skilled in the art that similar network management systems could be used with the inventive management system without departing from the spirit and scope of the invention. In this system, the management applications are able to access management information located in the management information database that is now sited in the management information server 208.

The management information server 208 interacts with the agents associated with the managed objects 216, 218 and 220, respectively. These agents are typically located remotely in the device nodes and can communicate with the management information server 208 by means of a variety of protocols. In particular, management information server 208 can operate with separate protocols by means of management protocol adapters 210, 212 and 214. For example, management information server 208 can communicate with SNMP agents 216 by means of an SNMP protocol adapter 210. Similarly, management information server 208 can communicate with SunNet manager (SNM) agents 218 by means of an SNM protocol adapter 212. In a like manner, management information server 208 can communicate with CMIP agents 220 by means of a CMIP protocol adapter 214.

The configuration illustrated in FIG. 2 allows separate management applications, such as applications 200, 204 and 206, to share information and operate with a remote database located in the management information server 208. Management information server 208 can, in turn, communicate with a number of local or remote agents 216, 218, and 220 over various network facilities including the internet by means of several different protocols.

Figure 3:
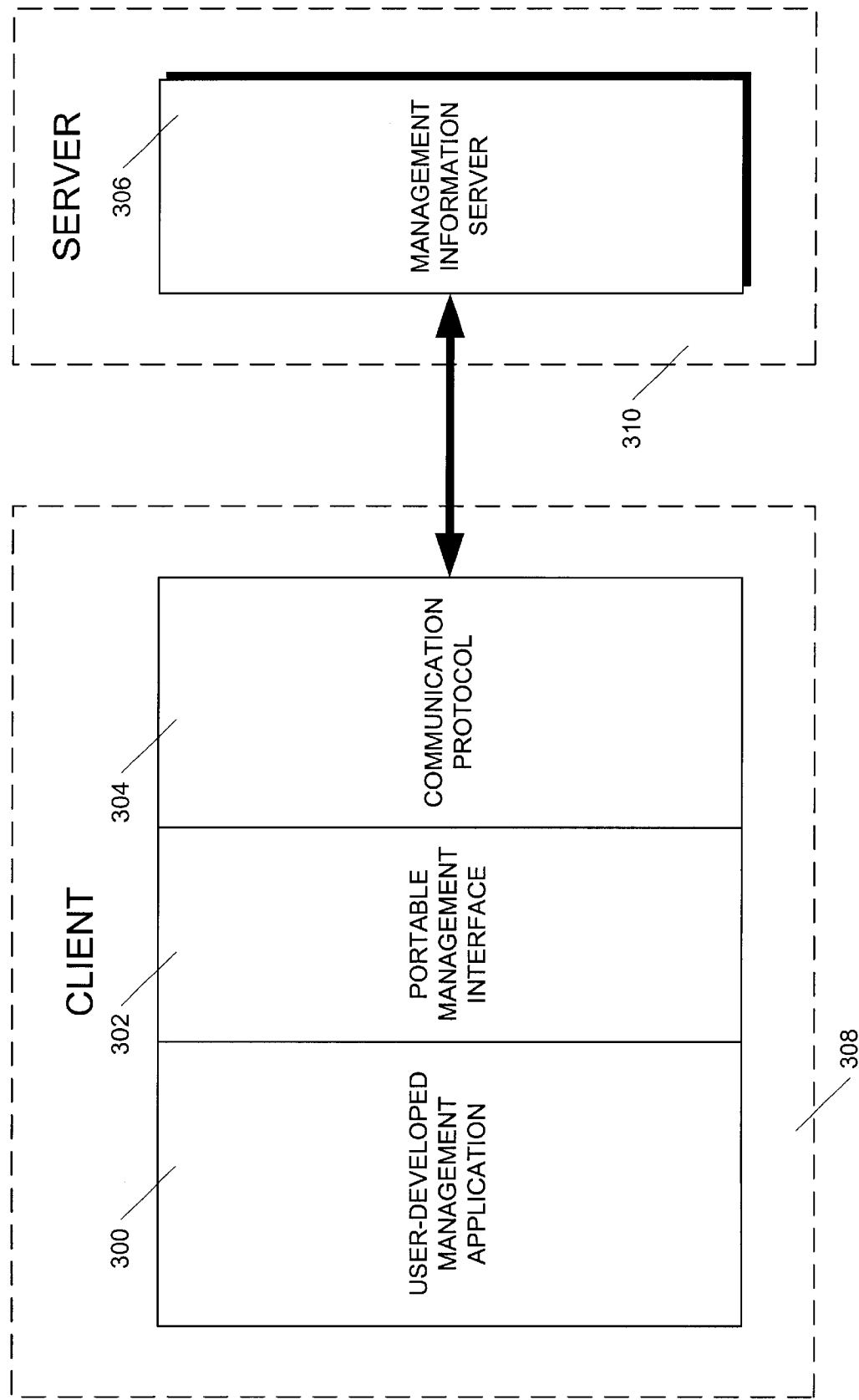
FIG. 3 is a block schematic diagram illustrating the communication between the user-developed management application and the MIS of the Solstice EM™ distributed network management system.

FIG. 3 illustrates, in a more detailed fashion, the manner in which user-developed management application 300 communicates with the MIS server 306. In particular, the user-developed management application 300 which is located in the client node 308 communicates with the management information server 306 located in the server node 310 by means of a portable management interface (PMI) 302. The portable management interface is an object-oriented interface which provides a consistent object-oriented access to the management information. It supports distributed applications that use various management protocols and address transparency. It utilizes a small number of C++ classes and allows for both asynchronous and synchronous applications, event registration for an application and various development services, such as runtime type checking.

The portable management interface 302 connects to the management information server 306 by means of a communication protocol indicated schematically as box 304. This protocol allows the portable management interface to access managed object instance state information stored or managed by the information server 306. It also allows access to managed object class schema stored by the management information server 306 and access to the event services provided by the management information server. The portable management interface 302 also allows managed object instance data to be cached in an application process and provides a simplified syntax for managed objects instance naming.

Events are handled in this system by a callback function registration procedure in which a user-developed management application which desires to obtain notification of an event which occurs in one of the devices, registers with the management information server 306 (by means of the portable management interface 302) an interest in the particular event. The application then acts as a "listener" for the event. When the event occurs, the management information server 306 callsback all of the interested listeners. An object in the portable management interface 302 then handles the event call by forwarding it to the user-developed management application 300.

Figure 4:
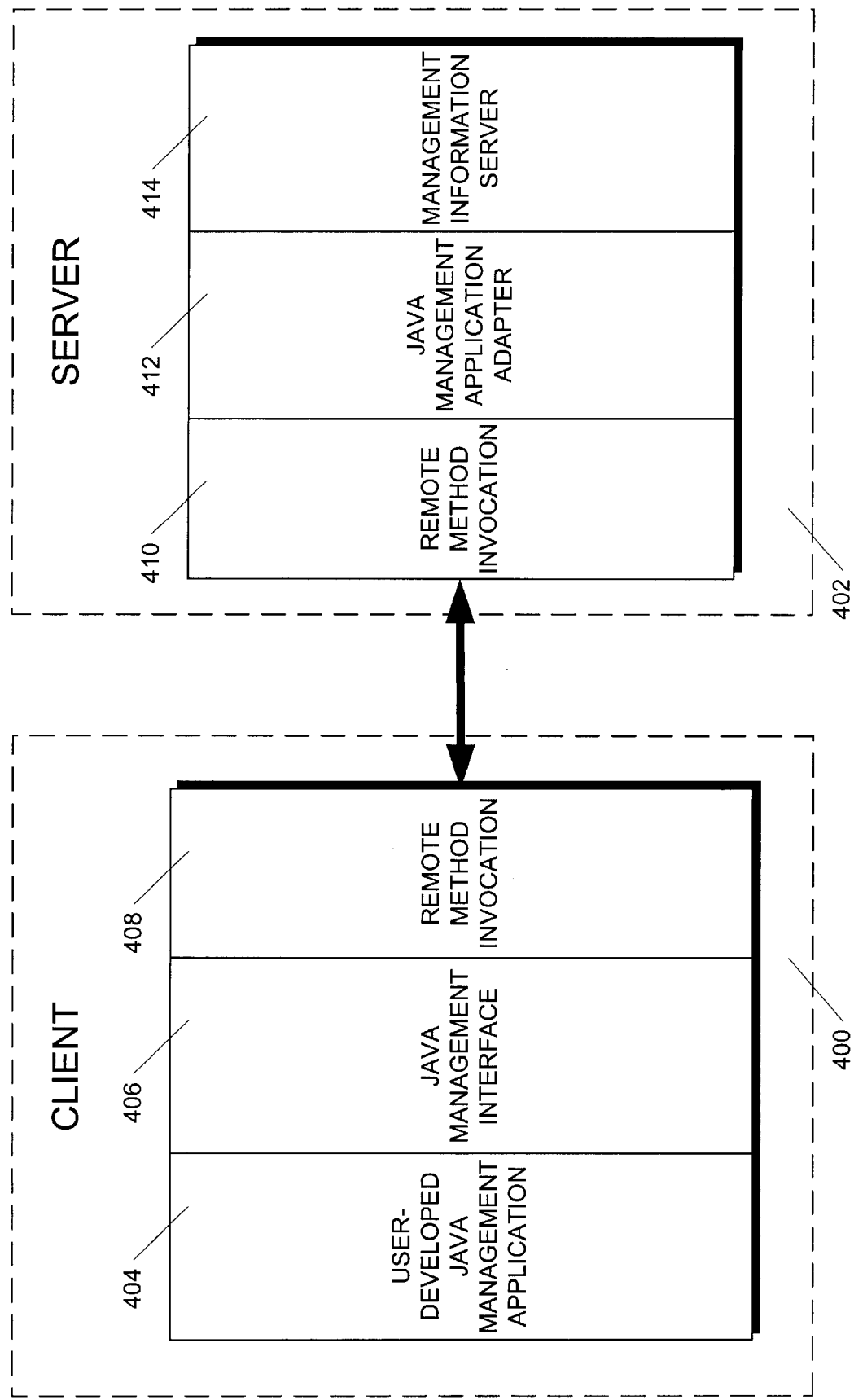
FIG. 4 is a block schematic diagram illustrating a Java implemented distributed management system built with the Solstice EM™ distributed network management system in accordance with the principles of the present invention.

FIG. 4 illustrates, in a high-level block schematic form, the components of a distributed management system constructed in accordance with the principles of the present invention. In particular, the illustrative management system consists of a Java management interface 406 (JMI) located in the client node 400. The JMI is usable from any input device capable of running the JVM and communicates with a Java management application adapter 412 (JMA) located in the server node 402. With this arrangement, a user-developed Java management application 404 communicates with the JMI 406.

The JMI 406, in turn, communicates, via a conventional remote object transport system, with the JMA 412. Such a remote object transport system could, for example, be a remote method invocation (RMI) system or a CORBA system which allows method calls to be made on a remotely-located object. With this system, a "stub" program, for example, shown as RMI program 408, communicates with a skeleton program illustrated as RMI program 410. Thus, a call to an object which is part of a JMI 406 results in the call being executed in an object in the JMA 412. The usage of RMI or CORBA is hidden from the JMI's public interface to allow for flexibility of implementation; for example, the described RMI transport can be replaced with a CORBA transport. Alternatively, it is possible to dynamically switch between an RMI implementation and a local implementation.

With this arrangement, the user-developed Java management application 404 can communicate with the management information server 414. However, the inventive system differs from the PMI utilized with the Solstice EM™ system in that almost all of the classes in the JMI 406 are one hundred per cent remote and the bulk of the API's implementation is delegated to the JMA. Class state or cached data will be located in the JMA 412 on the server 402 to minimize memory usage on the client 400.

Accordingly, most of the JMI class instances are not serialized and transported from the JMA to the JMI in order to reduce memory usage on the client side significantly. However, in accordance with one embodiment, instances of a single class, the EventReport class, are serialized and transported from the JMA to the client side. In particular, instances of the EventReport class are serialized and transported across to the client side to allow the client to browse through the event information. This operation is described in more detail below.

The JMI classes are arranged so that they do not return values indicating the result of operations unless a particular method requires that a value be returned. Consequently, whenever there is an error in operation, an exception is thrown to the client which the user can catch and take actions on.

Figure 5:
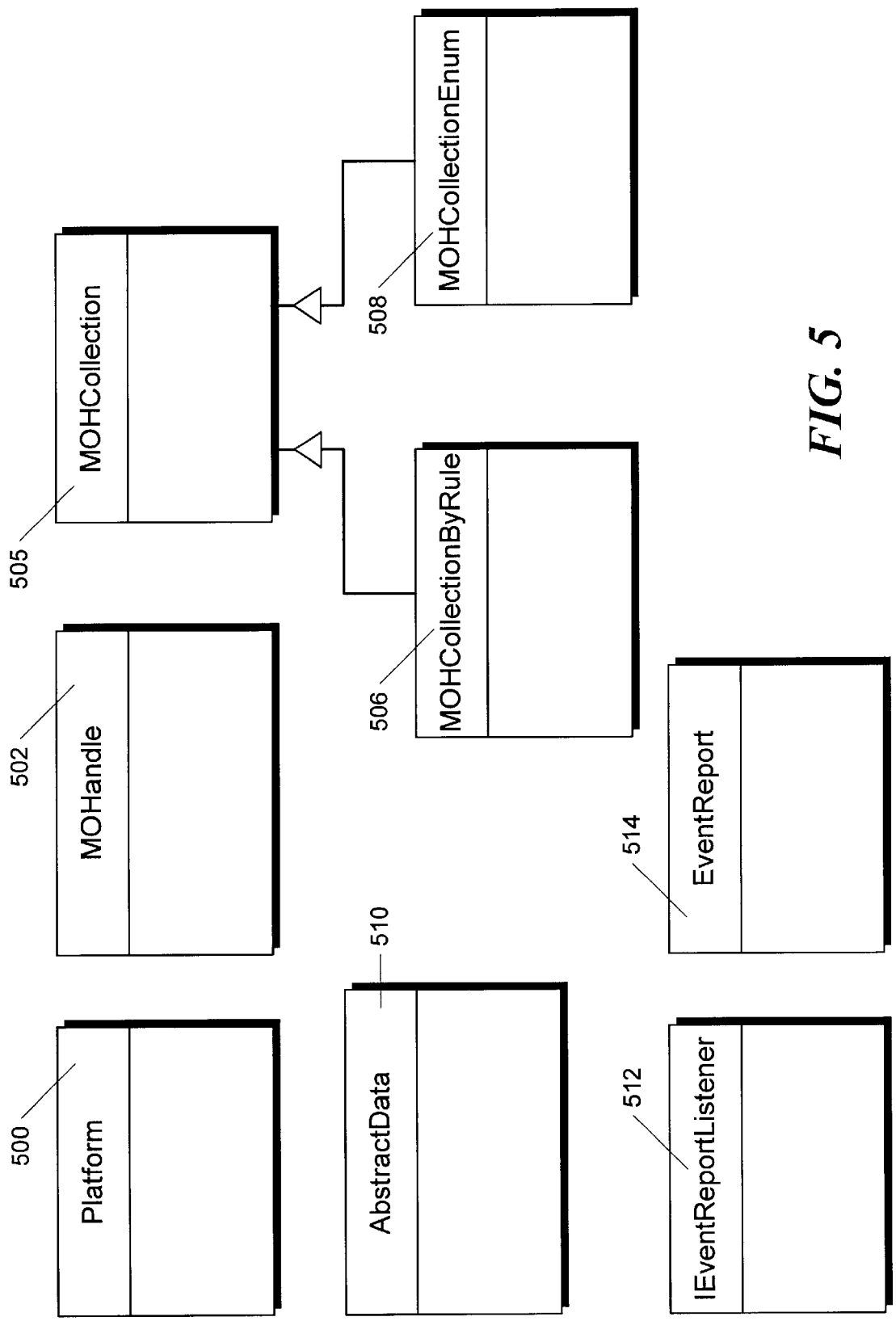
FIG. 5 is a class diagram illustrating the classes in the inventive Java Management Interface.

FIG. 5 illustrates the major classes in the JMI, including the Platform class 500, the MOHandle class 502, the MOHCollection class 504 and its derived classes MOHCollectionByRule 506 and MOHCollectionEnum 508, the AbstractData class 510 and the EventReport class 514.

In accordance with the architecture described above, the class instances in the JMI will consist of handles which are the internal API for communication between the public API and the actual implementation of the method in the JMA. The user will have an option to decide which transport mechanism to use for the link between the handle and the actual implementation. This way the user can decide to choose local implementation when the server resides on the local machine. Alternatively, the user could choose to use an RMI or CORBA interface. In all the different scenarios the internal API "handle" remains the same.

The JMI objects and methods can be used in a multi-threaded environment in a safe manner. As mentioned previously, these objects are pure Java interfaces and are not serializable. The JMI interface provides an ability to run management applications from any Java-enabled web browser or as a separate Java application taking advantage of this interface.

The Platform class 500 represents the handle to the JMA server. The following constructor allows JMI users to spawn off a middle-tier server (JMA) through which they are connected to a Solstice EM™ MIS.

public Platform (String host, String misName, String user, String password) throws JmiException In order to use this constructor, the user specifies the "host" where the JMA server resides. The "misName" is the name of the MIS to which the client application is connected. If access control is enabled for the MIS, then the "user" and "password" values provide the information for login to the MIS.

The following method provides a list of authorized features the user is allowed access for the application.

public AuthList getAuthorizedFeatures(String user, String appName) throws JmiException The following method provides a way of disconnecting from the MIS and associated JMA. The JMA associated with this connection will be shutdown as a result of this call.

public void disconnect() throws JmiException

The following method returns the name of the MIS to which Platform is connected to.

public String getMisName() throws JmiException

The following method returns the name of the user. (supplied during the construction of the Platform)

public String getUserName() throws JmiException

In addition, the Platform class 500 has five specific methods to register for various events that emanate from the MIS. The MIS uses a registry scheme in which users that are interested in an event register with the MIS. When the event occurs, the MIS sends a notification to the registered users. Three of these methods are most commonly used, namely an attribute value change method for changes in attributes of a managed object, an object creation method and an object deletion method . The three methods shown below add a registration for these events to the MIS event registry and allow the user to be notified when such an event occurs. The user is expected to provide a "listener" for these events which implements an interface defined by the IEventReportListener class. This interface specifies a handler method which a listener object must implement. More details are provided below in the description of the interface IEventReportListener.

public void addAttributeValueChangeListener (EventReportListener listener) throws JmiException public void addObjectCreationListener (EventReportListener listener) throws JmiException public void addObjectDeletionListener (EventReportListener listener) throws JmiException The users of a Solstice EM™ system are allowed to define their own managed objects, where they can define notifications that suit their needs. The following method allows a user to subscribe to any event which the MIS forwards to management applications. The corresponding listener should check for a specific event type and take actions accordingly.

public void addRawEventListener(EventReportListener listener) throws JmiException The management applications using the Platform class 500 may desire to know if the connection to the MIS or JMA is terminated. This can be detected by creating a PlatformDisconnectListener and adding the listener with the following method.

public void addDisconnectListener (PlatformDisconnectListener listener) throws JmiException Similar to the registration methods described above the following methods allow the user to de-register from receiving a particular event notification.

public void removeAttributeValueChangeListener (EventReportListener listener) throws JmiException public void removeObjectCreationListener (EventReportListener listener) throws JmiException public void removeObjectDeletionListener (EventReportListener listener) throws JmiException public void removeRawEventListener (EventReportListener listener) throws JmiException public void removeDisconnectListener (PlatformDisconnectListener listener) throws JmiException The MOHandle class 502 represents an "image" of the managed object in the MIS and allows information to be obtained from the managed object and parameters to be set. There are two MOHandle class constructors, one takes an object instance (for example, "logId='AlarmLog'") and the platform instance, the other takes an object instance, a class name ("log") and the platform instance.

public MOHandle (String instanceName, Platform platform) throws JmiException public MOHandle (String instanceName, String classId, Platform platform) throws JmiException The following methods allow users to manipulate the list of attributes which are tracked for a managed object. Every time an update from the MIS is obtained, only the attributes which are tracked get updated.

public String[] getTrackIdList() throws JmiException

An empty trackList in the following method means that no attributes are to be tracked.

public void setTrackIdList(String[] trackList) throwsJmiException

Using the following setTracking method, a user will be able to enable or disable tracking of the attributes in the MOHandle object.

public void setTracking(boolean tracking) throws JmiException public String[] removeFromTrackIdList(String[] trackList) throws JmiException Similarly, the following method provides a mechanism to get values of attributes in a MOHandle object, public String getStr(String attributeName) throws JmiException The following method allows the user to get values of more than one attribute at a time.

public String[] getStr(String[] attributeIdList) throws JmiException

The following get methods will return the names of all the attributes of the MOHandle.

public String[] getAttrNames() throws JmiException public long getLong(String attributeName) throws JmiException public double getdouble (String attributeName) throws JmiException public BigInteger getBigInteger(String attributename) throws JmiException The following method returns the value of the attribute in the form of an AbstractData object which is described below.

public AbstractData getRaw(String attributeName) throws JmiException

Figure 6:
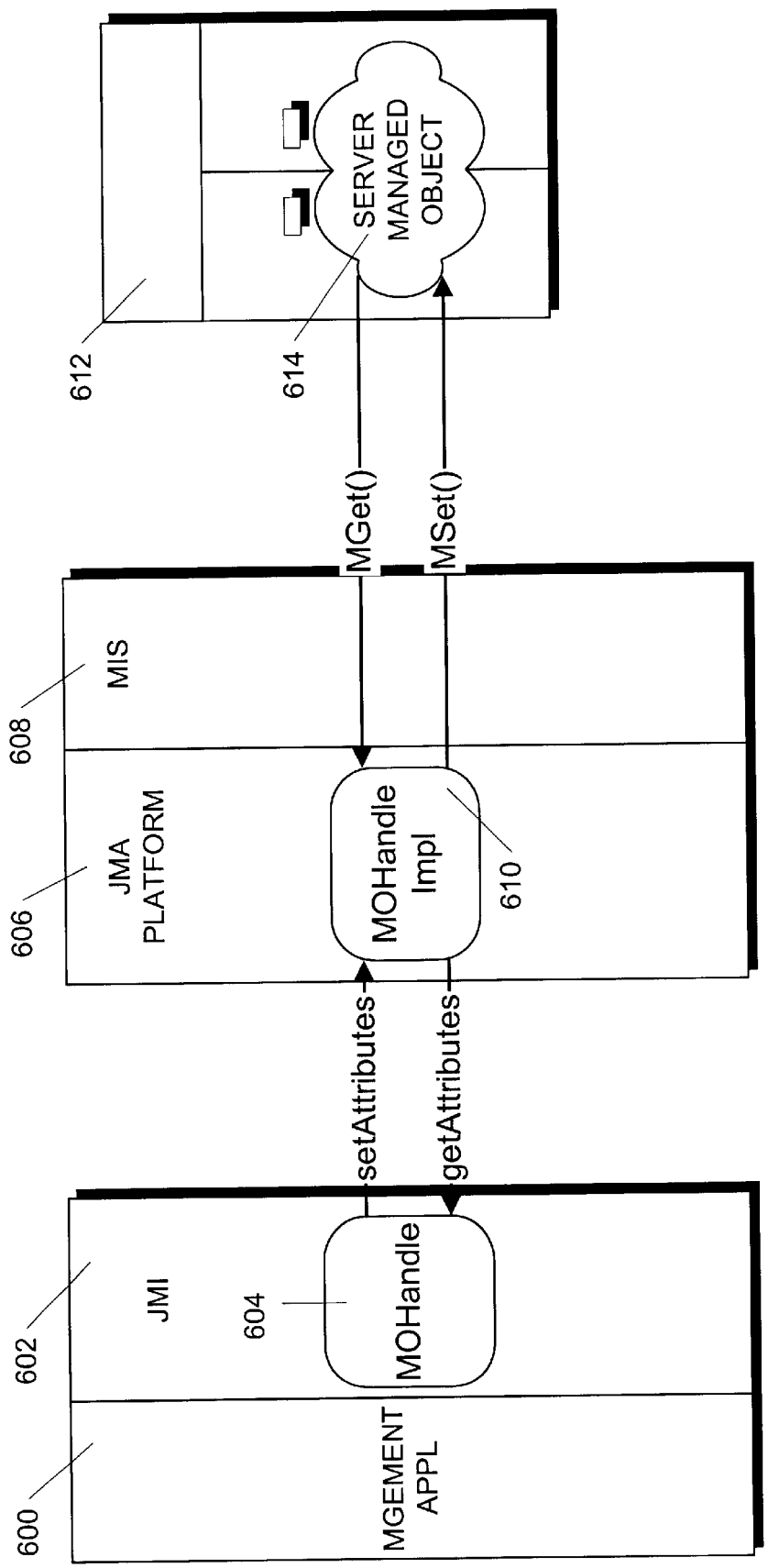
FIG. 6 is a block schematic diagram illustrating the operation of the management application with the Solstice EM™ distributed network management system with the inventive Java based interface.

The following methods provide means to set values of attributes in a MOHandle.

public void setStr(String attributeName, String attributeValue) throws JmiException public void setStr(String[] attributeIdList, String[] values) throws JmiException public void setLong(String attributeName, long attributeValue) throws JmiException public void setDouble(String attributeName, double attributeValue) throws JmiException public void setBigInteger(String attributeName, BigInteger attributeValue) throws JmiException public void setRaw(String AttributeName, AbstractData rawAttribute) throws JmiException A MOHandle object also contains methods for performing the various management operations allowed on a managed object. For example, an MGet operation gets information about the managed object at the time (snapshot) which includes metadata and attribute values from the MIS.

public void MGet(double timeout) throws JmiException public void MGet(String[] attrlist, double timeout) throws JmiException Similarly, an MSet operation modifies the values of attributes in the MIS (from the new values for some attributes). An MCreate operation creates a new object in the MIS from the MOHandle. An MCreateWithin operation creates a new object in the MIS under the specified superior object in the naming tree.

public void MSet(double timeout) throws JmiException public void MCreate(double timeout) throws JmiException public void MCreateWithin(String superiorObjectName, double timeout) throws JmiException An MDelete operation deletes an existing object from the MIS which is represented by the MOHandle and an MAction operation executes a specified action on an object in MIS (represented by MOHandle) and return the results to the user.

public void MDelete(double timeout) throws JmiException public String MAction(String actionName, String parameter, double timeout) throws JmiException FIG. 6 illustrates the cooperation of the MOHandle object 604 in JMI 602 and its implementation 610 in the JMA 606. The client management application 600 uses the methods in the MOHandle object 604 in the JMI 602 to manipulate data cached in the MOHandle object implementation located in JMA 606. For example, managed object attributes cached in MOHandle implementation 610 can be retrieved and manipulated via the getAttributes() and setAttributes() methods discussed above (indicated by the arrows marked getAttributes and setAttributes in FIG. 6.) The MOHandle implementation 610 interacts with the MIS 608 by using the MIS API. For example, in the case of the Solstice EM™ system, the MOHandle implementation would interact with the EM MIS using the aforementioned PMI. Since the MOHandle implementation is in Java, it interfaces with the PMI via the standard Java Native Interface. The Solstice EM™ system PMI maintains an "image" of the managed object in its implementing language (C++) and the MOHandle implementation 610 manipulates this image via the Solstice EM™ PMI.

The management application 600 can also update the cached values in the MOHandle implementation 610 and set the values in the managed object 614 by means of the MGet() and MSet() methods, respectively. Invocation of these methods on the MOHandle implementation 610 causes it to interact with the C++ image via the Solstice EM™ PMI, in turn, causing the MIS 608 to retrieve or set the values in a managed object 614 that corresponds the actual device 612. This is indicated schematically by the arrows marked MGet() and MSet() in FIG. 6.

The event generation and registration procedure for an MOHandle object is similar to that described above for the Platform object. The MOHandle object uses the following method to generate an event report:

public void MEventReport (String eventName, String eventInfo) throws JmiException The following three methods allow a user to subscribe to object creation, object deletion and an attribute value change for a managed object:

public void addAttributeValueChangeListener (EventReportListener listener) throws JmiException public void addObjectCreationListener (EventReportListener listener) throws JmiException public void addObjectDeletionListener (EventReportListener listener) throws JmiException The following method allows a user to register for any event for a managed object:

public void addRawEventListener(EventReportListener listener) throws JmiException Similar to the registration methods described above the following methods allow the user to de-register from receiving a particular event notification:

public void removeAttributeValueChangeListener (EventReportListener listener) throws JmiException public void removeObjectCreationListener (EventReportListener listener) throws JmiException public void removeObjectDeletionListener (EventReportListener listener) throws JmiException public void removeRawEventListener (EventReportListener listener) throws JmiException The JMI interface also includes two collection classes which allow MOHandle objects to be loosely grouped. The MOHCollection class 504 represents a collection of MOHandle objects in the application domain. The MOHCollection class 504 has two subclasses: MOHCollectionByRule 506 and MOHCollectionEnum 508. The MOHCollectionByRule class 506 is defined by the base object, a scope and a filter (which forms the rule). The membership of this object is strictly enforced based on the rule. The MOHCollectionEnum class 508 has a loose set of MOHandle objects in it. There is no constructor to create MOHCollection class 504 directly, so a user has to explicitly create either the MOHCollectionByRule class 506 or the MOHCollectionEnum class 508. The following methods are included in objects created from both subclasses. In order to iterate through the MOHandle objects which are contained in an MOHCollection object the user can call the following method. After invoking the method the user can call MOHandle operations on array elements.

public MOHandle[] getMOHandles() throws JmiException

Figure 7:
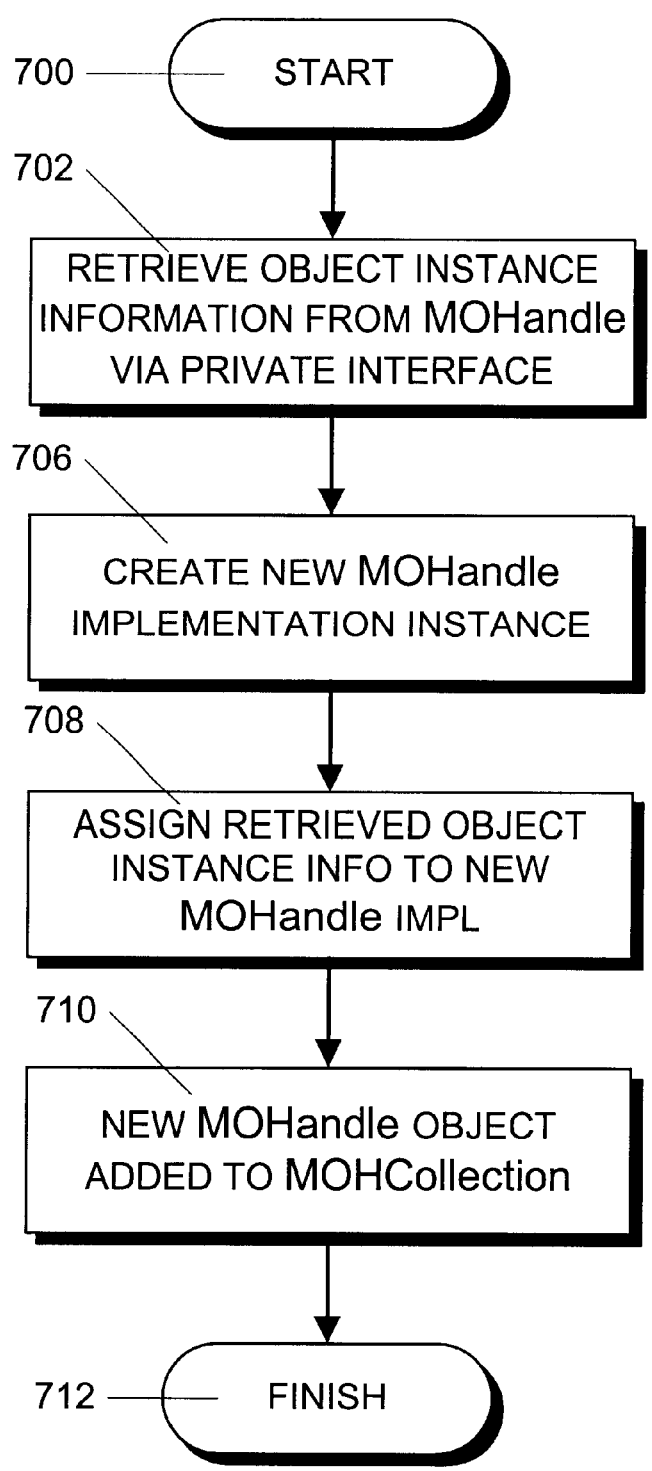
FIG. 7 is a flowchart showing steps in an illustrative process for adding new MOHandle objects to a MOHCollectionEnum container.

MOHCollection objects also allow collective operations on all the member MOHandle objects. Each collective method, in turn, calls the appropriate methods for the member MOHandle objects.

public void allSetProp (String AttributeName, String AttributeValue) throws JmiException public void MGet(double timeout) throws JmiException public void MSet(double timeout) throws JmiException public void MDelete(double timeout) throws JmiException public void MAction(String actionName, String objectClass, double timeout) throws JmiException The event registration for any type of MOHCollection object is similar to that described above for Platform objects. The following four methods allow user to subscribe to events resulting from a MOHandle object being included or excluded from a collection, an attribute value change for any MOHandle in the collection and any event.

public void addMOHincludedListener (EventReportListener listener) throws JmiException public void addMOHandleexcludedListener (EventReportListener listener) throws JmiException public void addAttributeValueChangeListener (EventReportListener listener) throws JmiException public void addRawEventListener(EventReportListener listener) throws JmiException Similar to the registration methods described above the following methods allow the user to de-register from receiving a particular event notification.

public void removeMOHincludedListener (EventReportListener listener) throws JmiException public void removeMOHexcudedListener (EventReportListener listener) throws JmiException public void removeAttributeValueChangeListener (EventReportListener listener) throws JmiException public void removeRawEventListener (EventReportListener listener) throws JmiException MOHCollectionByRule objects are built based on some derivation rule. A MOHCollectionByRule object is created from the MOHCollectionByRule class 506 by providing the base object name, the scope of the collection and a filter string in the following constructor. The user can provide a null if a filter is not required to define the collection:

public MOHCollectionByRule (String baseManagedObject, String scope, String filter, Platform platform) throws JmiException The following methods allows a user to retrieve and set the values used to create the rule:

public String getScope() throws JmiException public void setScope(String scope) throws JmiException public String getFilter() throws JmiException public void setFilter(String filter) throws JmiException public String getBaseManagedObject() throws JmiException public void setBaseManagedObject(String instanceName) throws JmiException Finally, the following methods will populate the collection based on the rule by issuing a scoped "Get" request to MIS and track objects in the colloection.

public void populate() throws JmiException public boolean getTracking() throws JmiException public void setTracking(boolean tracking) throws JmiException In addition to the standard event registration methods, the MOHCollectionByRule class 506 allows a user to register for events which indicate change in the membership of the collection. Such a change can occur due to either a member in the collection being created or deleted in the network or an attribute value change which causes an MOHandle object to be included or excluded if the attribute value was a part of the filter which constitutes the derivation rule. The following methods register for these events:

public void addMOHandleIncludedListener (EventReportListener listener) throws JmiException public void addMOHandleExcludedListener (EventReportListener listener) throws JmiException Similar to methods for registering of events in the case of a MOHandle object being included or excluded from the collection, the following methods allow user to de-register for such event notifications.

public void removeMOHandleIncludedListener (EventReportListener listener) throws JmiException public void removeMOHandleExcludedListener (EventReportListener listener) throws JmiException A MOHCollectionEnum object can be constructed from the MOHCollectionEnum class 508 with a single MOHandle object or an already existing collection. If the existing collection is an instance of MOHCollectionByRule class 506 then its inclusion in an MOHCollectionEnum collection converts the existing collection into a MOHCollectionEnum object, so the MOHCollectionByRule collection looses its property of tracking MOHandle objects which satisfy the rule, but it allows the user to directly manipulate the membership of the collection. The following constructors are used to create a MOHCollectionEnum object from the MOHCollectionEnum class 508:

public MOHCollectionEnum (Platform plat) throws JmiException public MOHCollectionEnum (MOHCollectionByRule that, Platform plat) throws JmiException In an MOHCollectionEnum object the user can add or delete members (MOHandle objects) and also add (or delete) an existing collection to create a bigger collection using the following methods:

public void MCreate(double timeout) throws JmiException public void MCreateWithin(String superiorObjectName, double timeout) throws JmiException public void include(MOHandle moHandle) throws JmiException public void exclude(MOHandle moHandle) throws JmiException public void include(MOHCollectionEnum collection) throws JmiException public void exclude(MOHCollectionEnum collection) throws JmiException FIG. 7 illustrates steps involved in one illustrative routine for adding new MOHandle objects to an MOHCollectionEnum collection. Such a routine must be used to avoid requiring access through the RMI interface/public wrapper class to communicate between two server objects.

In particular, the routine starts in step 700 and proceeds to step 702. When a new MOHandle object must be added to the MOHCollectionEnum collection, the object instance information in the new MOHandle instance is retrieved from the MOHandle object via a private interface as set forth in step 702. Next, in step 706, a new MOHandle implementation is created on the server side. In step 708, the retrieved object instance information is assigned to the newly-created MOHandle implementation. Finally, in step 710, the new MOHandle object is added to the list of MOHandles in the MOHCollection implementation. The process then ends in step 712.

The AbstractData class 510 is a combination of an attribute syntax and its value. Most of the methods described for the AbstractData class below deal with the 'value' part embedded within the object. The constructor for the AbstractData object is as follows:

public AbstractData (String attrName, Platform platform) throws JmiException

The following constructor creates a composite AbstractData from a given array of AbstractData objects.

public AbstractData (String attrName, AbstractData[] list, Platform platform) throws JmiException The following methods query an AbstractData object about its structure. They are applicable to either lists or scalar type data. The querying management application may need the information obtained to perform further queries on an AbstractData object. For example, if the AbstractData object is a list type, then the splitList method can be called public boolean isList() throws JmiException public boolean isSet() throws JmiException public boolean isSequence() throws JmiException public boolean isChoice() throws JmiException public boolean isAny() throws JmiException The following methods manipulate a composite AbstractData object. These methods are applicable to a list type object only.

public AbstractData[] splitList() throws JmiException public AbstractData extract(String navigation) throws JmiException public int numElements() throws JmiException The following methods set the values of a AbstractData object:

public void setStr(String data) throws JmiException public void setLong(long data) throws JmiException public void setDouble(double data) throws JmiException public void setAny(AbstractData data) throws JmiException public void setBigInteger(BigInteger data) throws JmiException Similarly, the following methods retrieve values from an AbstractData object. The getLong, getDouble methods etc. are specific methods to access data as specific types such as long, double etc. This type of access assumes that the user has knowledge of the type of the AbstractData object data and, as such, is able to get the data in a specific way.

public String getSTR() throws JmiException public long getLong() throws JmiException public double getDouble() throws JmiException public BigInteger getBigInteger() throws JmiException The following methods below are applicable to choice types only and allow a user to modify the member names of choice types.

public void setMemberName(String name) throws JmiException public String getMemberName() throws JmiException public String[] getMemberNames() throws JmiException As discussed above, any user registering for events must provide an object which implements the public interface IEventReportListener 512. This interface defines a public method:

public void handler(EventReport ind),

Whenever an event arrives at the JMI to which the user has subscribed, the JMI will call the above method with the argument EventReport which contains information about the event itself. The user can then query further on the EventReport object to get more information.

The EventReport class 514 can be used to instantiate the EventReport object which provides information about an event report itself and is passed to the user when an event is received for which the user has registered. The following method gives the full name of the event type. Such a name might for example, be "Rec. X.721 I ISO/IEC 10165-2: 1992":attributeValueChange public String getName()

The following calls return the event information in either String or AbstractData object form.

public String getInfo() throws JmiException public AbstractData getInfoRaw() throws JmiException The following method returns the name of the managed object. For example, the managed object name might be: subsystemId="EM-MIS"/emApplicationID=17:

public String getMOName()

The following method returns the name of the object class of the managed object. For example, the object class name might be: "EM GMI" emApplicationInstance:

public String getMOClass()

All exceptions defined by JMI inherit from the standard Java class Java.lang.Exception. The JmiException is the only exception thrown by the above-described public methods of the JMI This exception also encapsulates all the exceptions thrown internally within the JMI such as RemoteExceptions, PMI related exceptions etc.

The JMI uses an EventDispatcher class and an EventHandler class in the JMA to deliver event notifications to the user. As discussed above, for every MOHandle object, MOHCollection object and Platform object, the user can register for notification of specific events such as AttributeValueChange, ObjectCreation or MOHandleIncluded/Excluded for MOHCollectionByRule etc. A user who is interested in these events is expected to provide objects which implement the IEventReportListener interface. The user can either use the same listener object for different event registrations or provide separate listener objects for each event registration.

Figure 8:
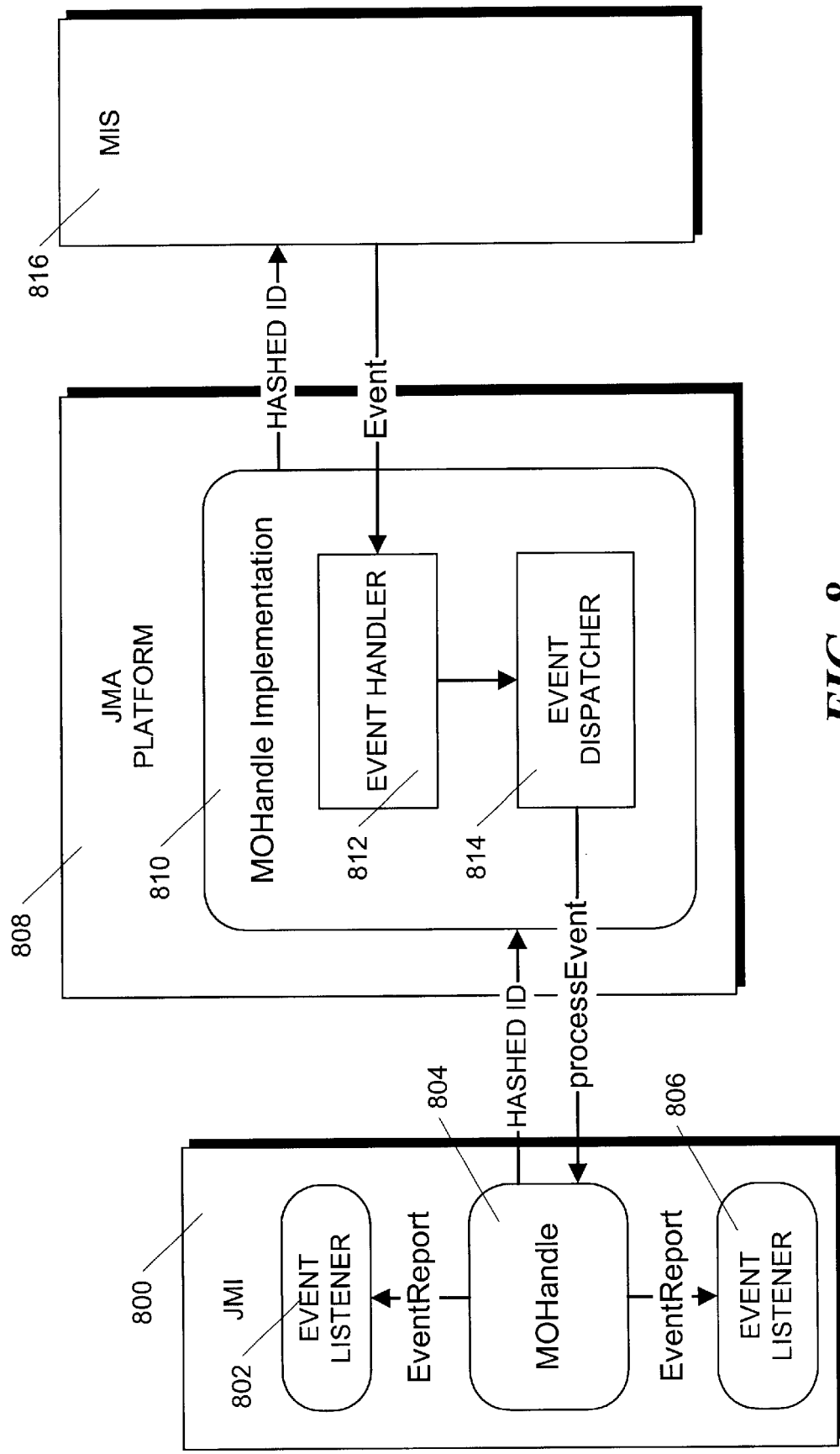
FIG. 8 is a block schematic diagram illustrating event processing in the inventive distributed management application.
Figure 9:
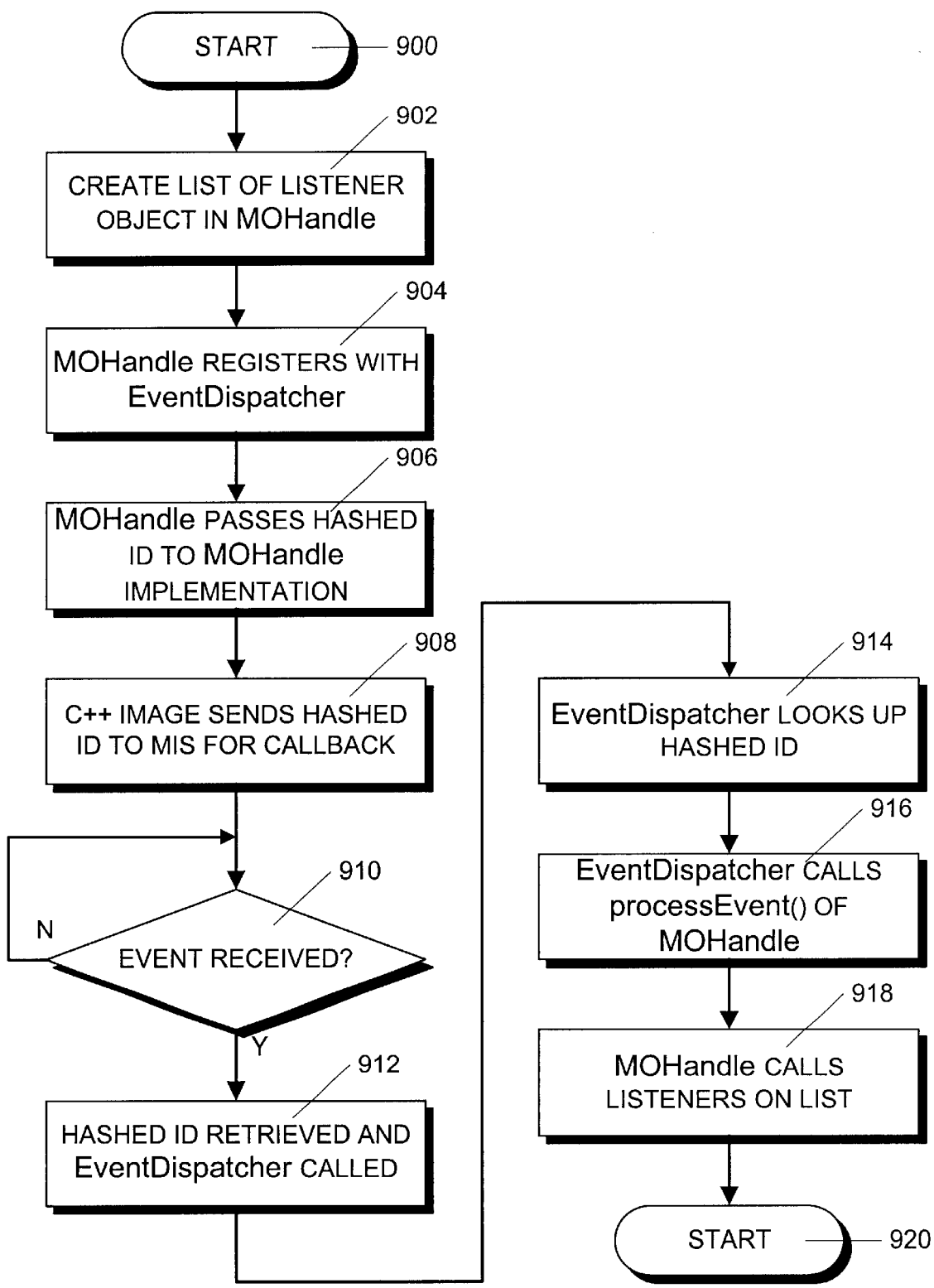
FIG. 9 is a flowchart showing steps in the an illustrative process for forwarding events generated by the MIS to the management application programs.

Event handling is carried out in the manner illustrated in FIG. 8 using the steps set forth in FIG. 9. The process set forth in FIG. 9 starts with step 900 and proceeds to step 902. In step 902, each MOHandle object 804 maintains a list (not shown) of all listener objects 802 and 806 for every event type. Next, as set forth in step 904, an MOHandle 804 registers itself with the EventDispatcher 814 with an ID which is a string representation of the MOHandle Instance name using a hash code (indicated by the "hased ID" arrow in FIG. 8.) At the same time, as indicated in step 906, the MOHandle object 804 informs the MOHandle implementation 810 about the event registration and passes this hashed ID. As previously discussed above, the MOHandle implementation 810 interacts with the MIS 816 via the Solstice EM™ PMI and a C++ image (not shown). In step 908, while registering for the particular event type the C++ Image sends the hashed ID as the user name for callback by the MIS 816.

The routine then waits for the registered event to occur as set forth in step 910. When the actual event is received on the server side as set forth in step 912, the same hashed ID is retrieved and a call to the EventHandler object 812 is made to forward the event.

The EventDispatcher object 814 keeps a hash table for each ID string and performs a lookup in step 914 in order to find the Instance 804 of the MOHandle object on the client side. In step 916, the EventDispatcher object 814 calls the processEvento method for that particular MOHandle object 804 (indicated by the arrow marked "processEvent".). The MOHandle object 804, in turn, will call all the listeners 802 and 806 for that event type as indicated in step 918. The process then ends in step 920.

JMI also supports removal of event notifications to a user. Although the underlying C++ PMI does not support callback de-registration, JMI can remove the listener from the list in the MOHandle object 804.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. A network management system for use in a distributed system having a client node with a management application program running therein and a server node having a management information server running therein, the management system comprising:

a platform-independent interface in the client node, the platform-independent interface having remote objects with interfaces which are accessible to the management application program;

a platform-independent adapter in the server node having object implementations for the remote objects and storage for storing data received from the management information server, the object implementations running entirely in the server and manipulating data in the storage so that the object implementations and data are not transmitted to the interface in the client node; and an object transport mechanism connecting the interface to the adapter.

2. A network management system according to claim 1 wherein the management information server has a platform-dependent interface and the adapter comprises a mechanism which connects to the platform-dependent interface.

3. A network management system according to claim 1 wherein the interface is written in the Java language.

4. A network management system according to claim 1 wherein the interface comprises at least one handle object which represents a managed resource.

5. A network management system according to claim 4 wherein the interface comprises a first container object for holding handle objects and wherein the first container object includes a rule for determining which handle objects are held therein.

6. A network management system according to claim 4 wherein the interface comprises a second container object for holding handle objects and wherein the second container object comprises a method by which a user can determine which handle objects are held in the second container.

7. A network management system according to claim 4 wherein the adapter comprises an event dispatcher object for receiving notifications from the management information server and a register method for each handle object to register with the event dispatcher object with an ID to receive the notifications.

8. A network management system according to claim 7 wherein the event dispatcher object registers with the management information server using the ID.

9. A network management system according to claim 7 wherein the event dispatcher comprises a mechanism which responds to a notification from the management information server by using the ID to locate a handle object and to forward the notification to the located handle object.

10. A network management system according to claim 9 wherein the located handle object comprises a mechanism for forwarding notifications to the management application program.

11. A method for use in a distributed network management system having a client node with a management application program running therein and a server node having a management information server running therein, the method comprising the steps of:

(a) creating a platform-independent interface in the client node, the platform-independent interface having remote objects with interfaces which are accessible to the management application program;

(b) creating a platform-independent adapter in the server node having object implementations for the remote objects and storage for storing data received from the management information server, the object implementations running entirely in the server and manipulating data in the storage so that the object implementations and data are not transmitted to the interface in the client node; and (c) using an object transport mechanism to connect the interface to the adapter.

12. A method according to claim 11 wherein the management information server has a platform-dependent interface and wherein step (b) comprises the step of:

(b1) using an interface mechanism to connect to the platform-dependent interface.

13. A method according to claim 11 wherein the interface is written in the Java language.

14. A method according to claim 11 wherein step (a) comprises the step of:

(a1) instantiating at least one handle object which represents a managed resource.

15. A method according to claim 14 wherein step (a) comprises the step of:

(a2) instantiating a first container object for holding handle objects and wherein the first container object includes a rule for determining which handle objects are held therein.

16. A method according to claim 14 wherein step (a) comprises the step of:

(a3) instantiating a second container object for holding handle objects and wherein the second container object comprises a method by which a user can determine which handle objects are held in the second container.

17. A method according to claim 14 wherein step (b) comprises the steps of:

(b2) instantiating an event dispatcher object for receiving notifications from the management information server; and (b3) registering each handle object with the event dispatcher object with an ID to receive the notifications.

18. A method according to claim 17 further comprising the step of:

(d) registering the event dispatcher object with the management information server using the ID.

19. A method according to claim 17 further comprising the steps of:

(e) responding to a notification from the management information server by using the ID to locate a handle object; and (f) forwarding the notification to the located handle object.

20. A method according to claim 19 wherein step (f) comprises the step of:

(f1) using the located handle object to forward notifications to the management application program.

21. A computer program product for use in a distributed network management system having a client node with a management application program running therein and a server node having a management information server running therein, the computer program product comprising a computer usable medium having computer readable program code thereon including:

(a) class code for creating a platform-independent interface in the client node, the platform-independent interface having remote objects with interfaces which are accessible to the management application program;

(b) class code for creating a platform-independent adapter in the server node having object implementations for the remote objects and storage for storing data received from the management information server, the object implementations running entirely in the server and manipulating data in the storage so that the object implementations and data are not transmitted to the interface in the dient node; and (c) program code for creating an object transport mechanism to connect the interface to the adapter.

* * * * *